United States Patent
Ben-Moshe et al.

(10) Patent No.: US 8,610,879 B2
(45) Date of Patent: Dec. 17, 2013

(54) DEVICE FOR IMPARTING DISTANCE INFORMATION

(71) Applicants: Boaz Ben-Moshe, Herzliya (IL); Nir Shvalb, Nesher (IL)

(72) Inventors: Boaz Ben-Moshe, Herzliya (IL); Nir Shvalb, Nesher (IL)

(73) Assignee: Ariel-University Research and Development Co., Ltd., Ariel (IL)

( * ) Notice: Subject to any disclaimer, the term of this patent is extended or adjusted under 35 U.S.C. 154(b) by 0 days.

(21) Appl. No.: 13/908,004

(22) Filed: Jun. 3, 2013

(65) Prior Publication Data

US 2013/0271745 A1    Oct. 17, 2013

Related U.S. Application Data

(63) Continuation of application No. PCT/IB2011/055466, filed on Dec. 5, 2011.

(30) Foreign Application Priority Data

Dec. 6, 2010  (GB) .................................. 1020616.7

(51) Int. Cl.
*G01C 3/08* (2006.01)

(52) U.S. Cl.
USPC ......... 356/4.01; 356/3.01; 356/4.1; 356/5.01; 356/5.1

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 5,487,669 | A  | 1/1996  | Kelk       |
| 6,298,010 | B1 | 10/2001 | Ritz et al. |
| 2009/0234576 | A1 | 9/2009 | Chen et al. |

FOREIGN PATENT DOCUMENTS

| FR | 2851159 | 8/2004 |
| WO | 03032889 | 4/2003 |
| WO | 2012077039 | 6/2012 |

OTHER PUBLICATIONS

Dynamic Environment Exploration Using a Virtual White Cane D. Yuan and R. Manduchi Department of Computer Engineering, University of California, Santa Cruz Proceecdings of the 200,5 IEEE Computer Society Conference on Computer Vision and Pattern Recognition (CVPR'05) 1063-6919/05.*

International Search Report and Written Opinion of PCT/IB2011/055466.

Yuan et al., "A Tool for Range Sensing and Environment Discovery for the Blind," Proceedings of the 2004 IEEE Computer Society Conference on Computer Vision and Pattern Recognition Workshops (CVPRW04), 1063-6919/04.

Yuan et al., "Dynamic Environment Exploration Using a Virtual White Cane," Proceedings of the 2005 IEEE Computer Society Conference on Computer Vision and Pattern Recognition (CVPR'05), 1063-6919/05.

* cited by examiner

*Primary Examiner* — Luke Ratcliffe
(74) *Attorney, Agent, or Firm* — Law Office of Joseph L. Felber

(57) ABSTRACT

Disclosed are methods and devices for imparting distance information to a human subject, for example a visually-impaired subject.

20 Claims, 3 Drawing Sheets

DEVICE FOR IMPARTING DISTANCE INFORMATION

RELATED APPLICATIONS

The present application is a continuation of PCT/IB2011/055466 having an International Filing Date of Dec. 5, 2011 published on Jun. 14, 2012 as WO 2012/077039, that gains priority from UK Patent Application 1020616.7 filed Dec. 6, 2010, both which are incorporated by reference as if fully set-forth herein.

FIELD AND BACKGROUND OF THE INVENTION

The invention, in some embodiments, relates to methods and devices for imparting distance information to a human subject, especially a visually-impaired human subject.

The invention, in some embodiments, relates to the field of assistance for the visually-impaired, and more particularly, in some embodiments, to methods and devices for imparting distance information to a visually-impaired human subject.

Visual perception enables humans to be aware of surrounding objects, to navigate and to interact with the world.

Blindness is the condition of lacking visual perception due to physiological or neurological factors. Total blindness involves complete loss of perception of form and visual light. In North America and most of Europe legal blindness is defined as visual acuity of 20/200 (6/60) or less in the better eye with best correction possible. Approximately ten percent of those deemed legally blind are totally blind, the rest having anything from minimal light perception to relatively good acuity.

Visually-impaired, including totally blind, people require methods and tools that allow completion of daily activities using the remaining senses. Such tools include the white cane which is used to extend the range of a user's touch to about 100 to 150 cm to allow independent locomotion.

For use, the white cane is usually swung in a low sweeping motion across an intended path of travel to detect physical features that may constitute an obstacle including upwardly projecting features such as stairs and poles and downwardly projecting features such as curbs and holes.

The white cane is invasive: to detect an object, the white cane must contact the object which may not be convenient when the object is fragile, moving or is a living being. The white cane requires that the user walk close to a curb or a wall which may be inconvenient or undesirable. The white cane allows detection of the presence of an object within the reach of the cane but gives no other information about the surroundings. Suspended obstacles are not easily detectable. The white cane provides little information regarding the appearance (e.g., size and shape) of an object.

A "virtual" white cane has been disclosed by Yuan D and Manduchi R (Dept. Comp. Eng., U. California, Santa Cruz, USA, described in Proceedings of the 2004 and the Proceedings of the 2005 IEEE Computer Society Conference on Computer Vision and Pattern Recognition). The Yuan and Manduchi virtual white cane collects range information by a short-baseline triangulation system formed by a point laser (2 mrad nominal divergence) and a miniature camera (1024× 768 CCD pixels). Specifically, a user scans the environment by swinging the device around a horizontal axis (up and down) at a constant rate and acquires instantaneous range information at the camera frame rate (15 Hz). At least two succeeding frames are used to determine a range which is then used to identify discontinuous environmental features critical for mobility such as curbs, steps and drop-offs. Specifically, the time profile of determined ranges is analysed by an on-board processor implementing an extended Kalman filter to identify a discontinuous feature. Information about detected environmental features is imparted to the user with special haptic primitives such as small jolts, that are likely to be unpleasant, especially when repeated, such as when scanning a flight of stairs.

The device, though purportedly hand-held, is ungainly, comprising a round handle with a diameter of about 4 cm to which distal end is secured a component housing about 10 cm deep, 15 cm high and 30 cm wide. In the above-referenced documents is reported that the distance between the camera and laser aperture is 8 cm, although from a photograph (2005 document) it is seen that the distance is far greater. The device does not provide instantaneous distance information, but only information about the presence of large discontinuities, on the order of 27 cm. The device is difficult to use, working only when scanned at an impractically slow and preferably constant rate of 7°/sec.

In addition to the two articles authored by Yuan and Manduchi referenced above, devices and methods known in the art that provide a background for understanding the teachings herein are described in U.S. Pat. No. 5,487,669.

SUMMARY OF THE INVENTION

The invention, in some embodiments, relates to methods and devices for imparting distance information to a human subject, especially a visually-impaired human subject. More particularly, in some embodiments the invention relates to methods and devices for determining distance information and imparting the distance information to a human subject, and in some embodiments, determining and imparting distance information useful for a visually-impaired human subject.

According to an aspect of some embodiments of the present invention, there is provided a device for imparting distance information to a human subject, comprising:

a) a hand-holdable housing having a front end and an axis, configured so when the housing is held in a human hand with the front end forwards, the axis points straight ahead;

b) physically associated with the housing, a light-source configured for projecting a beam of light through a light-source aperture in a direction not more than 4° divergent from parallel to the axis;

c) physically associated with the housing, a light-detector configured to detect light projected by the light-source, reflected from a reflecting object located at a distance from the front end between a minimum distance (in some embodiments not more than about 120 cm) and a maximum distance (in some embodiments at least about 200 cm) and entering through a light-detector aperture, at a frame rate (in some embodiments at least about 15 Hz) where a detection location of the light reflected from a reflecting object on an epipolar line of the light-detector is dependent on the distance to the reflecting object; and d) functionally associated with the light-detector, a distance reporter configured to produce a signal perceptible to a human subject at a reporting rate, the perceptible signal modulated as a function of the detection location at a reporting rate;

wherein the light-source aperture and the light-detector aperture are separated by an inter-aperture separation of not more than about 5 cm wherein along the epipolar line between the detection location of light reflected from a reflecting object at the minimum distance and the detection location of light reflected from a reflecting object at the maximum distance there are at least about 20 distinct detection locations, and wherein the perceptible signal is modulated differently for each of the at least about 20 distinct detection locations.

In some embodiments, the angle of view of the light-detector is at not more than about ten times the minimal angle of view required to acquire light reflected from a reflecting object at the minimum distance and from a reflecting object at the maximum distance onto the light-detector.

In some embodiments, the angle of view of the light-detector is at not more than about 10°.

In some embodiments, the distance reporter is configured to modulate the perceptible signal at a reporting rate faster than half the frame rate and in some embodiments even at a reporting rate equal to the frame rate.

In some embodiments, the device further comprises a lens to direct the reflected light to the light-detector. In some embodiments, the lens is a telephoto lens. In some embodiments, the lens is a super telephoto lens.

In some embodiments, the modulation of the perceptible signal comprises modulating a frequency of the perceptible signal as a function of the detection location. In some embodiments, for each of the distinct detection locations there is a corresponding specific modulation of the perceptible signal.

In some embodiments, the perceptible signal is an aural signal.

In some embodiments, the perceptible signal is a tactile signal.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

BRIEF DESCRIPTION OF THE FIGURES

Some embodiments of the invention are described herein with reference to the accompanying figure. The description, together with the figure, makes apparent to a person having ordinary skill in the art how some embodiments of the invention may be practiced. The figure is for the purpose of illustrative discussion and no attempt is made to show structural details of an embodiment in more detail than is necessary for a fundamental understanding of the invention. For the sake of clarity, some objects depicted in the figure are not to scale.

In the Figures.

DESCRIPTION OF SOME EMBODIMENTS OF THE INVENTION

Figure 1A:
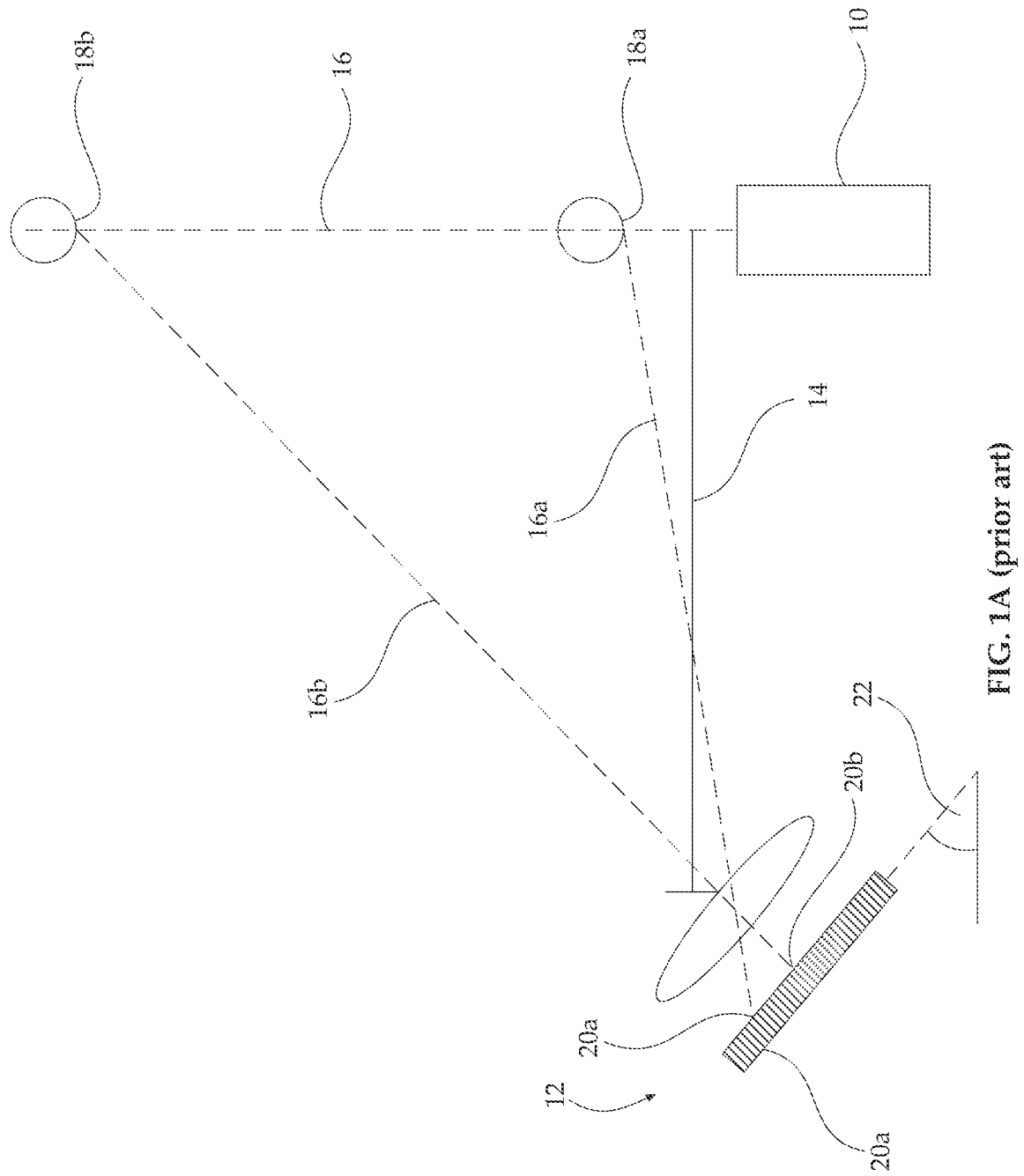
FIG. 1A (prior art) is a schematic representation of the principles of operation of a device for imparting distance information to a human subject.

The invention, in some embodiments, relates to methods and devices for imparting distance information to a human subject, especially a visually-impaired human subject. More particularly, in some embodiments the invention relates to methods and devices for determining distance information and imparting the distance information to a human subject, and in some embodiments, determining and imparting distance information useful for a visually-impaired human subject.

As discussed above, the white cane is an important device used by the visually-impaired to help in perceiving the world. That said, the white cane has a number of disadvantages.

An alternative to the white cane is the virtual white cane device disclosed by Yuan and Manduchi as noted above. The Yuan and Manduchi device is unwieldy and is difficult to use due to the required slow and constant scanning rate. Scanning is around a horizontal axis (up and down) and not a more intuitive vertical axis (left and right). The device provides information about the presence of large (and not small) discontinuities.

Some embodiments of the device described herein can be considered to be a virtual white cane, that in some embodiments have advantages over the known white cane commonly used by the visually impaired or the virtual white cane described in the art.

The principles, uses and implementations of the teachings of the invention may be better understood with reference to the accompanying description and figures. Upon perusal of the description and figures present herein, one skilled in the art is able to implement the teachings of the invention without undue effort or experimentation.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

According to a feature of some embodiments of the invention there is provided a device for imparting distance information to a human subject, comprising:

a) a hand-holdable housing having a front end and an axis, configured so when the housing is held in a human hand with the front end forwards, the axis points straight ahead;

b) physically associated with the housing, a light-source configured for projecting a beam of light through a light-source aperture in a direction not more than about 4° divergent from parallel to the axis;

c) physically associated with the housing, a light-detector configured to detect light projected by the light-source, reflected from a reflecting object located at a distance from the front end between a minimum distance and a maximum distance and entering through a light-detector aperture, at a frame rate where a detection location of the light reflected from a reflecting object on an epipolar line of the light-detector is dependent on the distance to the reflecting object; and d) functionally associated with the light-detector, a distance reporter configured to produce a signal perceptible to a human subject at a reporting rate, the perceptible signal modulated as a function of the detection location at a reporting rate;

wherein the light-source aperture and the light-detector aperture are separated by an inter-aperture separation of not more than about 5 cm
wherein along the epipolar line between the detection location of light reflected from a reflecting object at the minimum distance and the detection location of light reflected from a reflecting object at the maximum distance there are at least about 20 distinct detection locations, and
wherein the perceptible signal is modulated differently for each of the at least about 20 distinct detection locations.

In some embodiments, the inter-aperture separation is not more than about 4 cm, not more than about 3 cm, not more than about 2 cm and even not more than about 1 cm. In some embodiments, the inter-aperture separation is between about 5 cm and about 0.5 cm, and in some embodiments between about 3 cm and about 1 cm.

The minimum distance and the maximum distance may be any pair of distances that are suitable for the intended use of the device. Generally, the minimum distance and the maximum distance are selected so that the device is useful for assisting locomotion of a visually-impaired person. In some embodiments, the minimum distance is not more than about 120 cm, not more than about 100 cm and even not more than about 80 cm. In some embodiments, the maximum distance is at least about 200 cm, at least about 300 cm, at least about 400 cm, and even at least about 500 cm. In some embodiments, the maximum distance is not more than about 300 cm, not more than about 400 cm and even not more than about 500 cm.

The basic physical principle by which embodiment determines distance information to impart to a human user is epipolar geometry, that is to say the difference in view that two spaced-apart points have on the same volume. These principles are discussed with reference to FIGS. 1A and 1B.

In FIG. 1A, a device similar to the device described by Yuan and Manduchi is schematically depicted including a light-source 10 and a light-detector 12 which apertures are separated by an inter-aperture separation 14. Light-source 10 projects a beam of light 16. The beam of light is reflected from a reflecting object 18a or 18b towards light-detector 12 according to a path, 16a or 16b respectively, that is dependent on the distance between light source 10 and object 18a or 18b, distance-dependent path 16a or 16b respectively, to be detected on the epipolar line of light-detector 12 at a detection location, 20a or 20b respectively, that is dependent on the distance to the respective object 18a or 18b. Vergence angle 22 (the angle at which light-detector 12 faces beam 16 projected by light-source 10) is such that light reflected from some distance (between the minimum and maximum distance to objects that the device is configured to report) is perpendicular to light-detector 12.

Figure 1B:
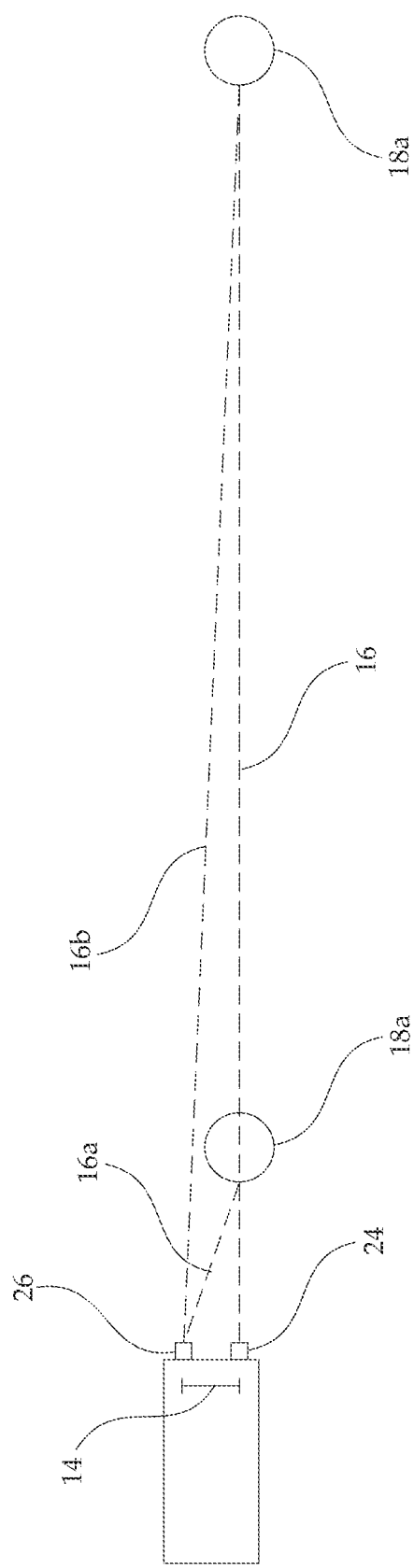
FIG. 1B is a schematic representation of the principles of operation of an embodiment a device for imparting distance information to a human subject as described herein.

In FIG. 1B, an embodiment of a device as described herein is schematically depicted where an inter-aperture separation 14 between apertures of a light-source 24 and light-detector 26 is small, in accordance with the teachings herein. It is seen that when inter-aperture separation 14 is small, the vergence angle (not depicted in FIG. 2B) is much smaller then when inter-aperture separation 14 is large as in FIG. 1A. As is known to one skilled in the art and by comparing FIGS. 1A and 1B, it is qualitatively seen that distance resolution (the distance between two detection locations 20 on light-detector 12 as a function of the distance to two respective reflecting objects 18) is distance-dependent. The detection locations of two closer reflecting objects separated by given distance are further apart on light-detector 12 than the detection locations of two further reflecting objects separated by the same given distance. Consequently, all other things being equal, there is a disparity between the distance resolution to closer object and to further objects: the distance resolution for closer objects being greater than than the distance resolution for further objects. The greater the inter-aperture separation 14, the less the disparity, and conversely, the lesser the inter-aperture separation the greater the disparity.

It is generally accepted that the greater the inter-aperture separation, the more distance information can be gathered. Further, inherent errors such as assembly inaccuracies and inherent inaccuracies of the components become more significant with smaller inter-aperture separation.

It has been found that despite the above, for certain uses such as the uses described herein, in some embodiments a small inter-aperture separation and the concomitant high disparity between distance resolution for near and far distances not only provides sufficiently useful distance information, but in fact provides the distance information that is most useful for a visually-impaired person. Further, it has been found that the acquired distance information can be imparted to a user in a simple and useful fashion.

Specifically, in order to be of use to a visually-impaired person, a device imparting distance information should not only impart a measure of the actual distance to objects, but no less importantly, the presence of discontinuities. This is both because discontinuities (e.g., stairs, stoops, potholes) are the greatest limitations on mobility and also because discontinuities define the outline of an object (e.g., a door way, a curb, a wall). That said, in order to be of use to a visually-impaired person, the size resolution of discontinuities is advantageously distance-dependent: knowledge of the presence of a 5 cm high brick on the ground at 3 meters is not very important but is of critical importance if the brick is just before the feet of a walking person; it is more important to know the distance to an obstacle at about 150 cm with an accuracy of 20 cm than to know the distance to an obstacle at about 400 cm with an accuracy of 100 cm.

As stated above, in some embodiments, as a consequence of the detection of light reflected from a reflecting object, a distance reporter of a device as described herein produces a signal perceptible to a human subject, the signal modulated as a function of the detection location of the reflected light at a reporting rate.

During use, a user aims the front end of the device in different directions, usually by scanning, swinging or sweeping the device back and forth in a direction of interest. As the device is aimed in the different directions, the beam of light projected by the light-source is reflected from reflecting objects at different distances and is detected at a on of at least about 20 different detection locations on the epipolar line of the light-detector at a frame rate, where the detection location is dependent on the distance to the reflecting object.

The distance reporter produces a perceptible signal that is differently modulated at a reporting rate for each of the at least about 20 distinct detection locations and consequently is modulated as a function of the distance to the object, with a distance resolution that is distant-dependent, greater distance resolution for close objects and lesser distance resolution for farther objects.

It has been found that a human user of a device as described herein, especially a visually-impaired human user, is able to notice the differences in modulation of the perceptible signal and intuitively translate these differences to physical features where the disparity in range resolution arising from the inter-aperture separation provides useful distance information: sufficiently high resolution at close distances to identify important features but not excessive resolution at far distances that would be potentially confusing. Thus, in some embodiments the distance-dependent distance resolution arising from the small inter-aperture separation allows for simple and intuitive imparting of useful distance information to a user of a device as described herein, that in some embodiments is simple to implement and provides necessary distance information at a faster rate, for example when compared to the device of Yuan and Manduchi.

It has been found that a device as described herein is highly effective at imparting distance information relating to discontinuities. For example, in some embodiments when a region having a constant distance (a smooth floor in an arc around the user) or a gradually changing distance (a smooth floor in a direction away from or towards the user) is scanned, the modulation of the perceptible signal remains constant or changes continuously and gradually. However, when a discontinuity is scanned, the modulation of the perceptible signal is also perceivably discontinuous. In this context, the distance-dependent distance resolution arising from the small inter-aperture separation proves useful: at close distances (e.g., 120 cm) small discontinuities (e.g., a 5 cm brick in front of the user) are reported while at further distances (e.g., 300 cm) imparting information about small discontinuities would not be exceptionally useful and is potentially confusing.

As the perceptible signal is modulated as a function of the detection location, the reporting rate (the rate at which the modulation of the perceptible signal is changed) is only limited by the frame rate of the light-detector. As a result, with a sufficiently high frame rate, in some embodiments there is no need for a fixed, accurate or slow scanning of an area of interest by a user. A user scans an area of interest at any convenient speed and perceives the differences in modulation of the perceptible signal. If greater spatial detail is required, the person can optionally scan some or all of the area of interest more slowly, again, at any convenient speed.

The frame rate can be any suitable frame rate. That said, in order to allow a user the freedom to scan an area of interest at any desired speed, in some embodiments the frame rate of the light-detector is as fast as possible. Thus, in some embodiments, the frame rate is at least about 15 fps (frames per second), at least about 30 fps, at least about 40 fps, at least about 60 fps, at least about 80 fps at least about 100 fps, and even at least about 200 fps. Detectors having suitable frame rates are commercially available, for example, from Fairchild Imaging (Milpitas, Calif., USA).

In some embodiments, the distance reporter is configured to produce the perceptible signal modulated as a function of a detection location at a given reporting rate (the rate at which the modulation of the perceptible signal is changed). The reporting rate may be any suitable reporting rate. That said, in order to allow a user the freedom to scan an area of interest at any desired speed, in some embodiments the reporting rate of the light-detector is as fast as possible, that in general can be no more frequent than the frame rate of the light-detector. In some embodiments, the reporting rate is faster than half the frame rate (e.g, for a frame rate of 30 fps, a reporting rate of at least about 16 Hz, for a frame rate of 60 fps, a reporting rate of at least about 31 Hz). In some such embodiments, the reporting rate is equal to the frame rate (e.g, for a frame rate of 15 fps, a reporting rate of 15 Hz, for a frame rate of 80 fps, a reporting rate of 80 Hz). In some embodiments, the distance reporter is configured to modulate the perceptible signal at a reporting rate faster than half the frame rate. In some embodiments, the distance reporter is configured to modulate the perceptible signal at a reporting rate equal to the frame rate. In some embodiments, the distance reporter is configured to produce a substantially continuous perceptible signal that is modulated at a reporting rate faster than half the frame rate. In some embodiments, the distance reporter is configured to produce a substantially continuous perceptible signal that is modulated at the frame rate so that the reporting rate is the same as the frame rate.

In some embodiments, distance information such as the presence of discontinuities is not acquired by comparing two or more discrete detection events and no complex calculations are needed to provide distance information. Rather, in some embodiments the distance information acquired is directly reported to a user by the modulation of the perceptible signal, and the user is able to identify discontinuities by perceptible changes in modulation of the perceptible signal. In some embodiments the reporting rate is the same as the frame rate and substantially every detection event by the light-detector leads to a potential change in modulation of the perceptible signal.

In some such embodiments, the combination of a high frame rate coupled with a high reporting rate has a number of additional advantages.

For example, random errors in determining the detection location on the light-detector become insignificant and are "drowned out" by the much larger number of correct determinations of detection locations.

For example, in some embodiments incidental detection of light that is not from the light-source, but from another light-source (e.g., another such device, another device such as a fire alarm) is insignificant as a short-lived incorrect modulation of the perceptible signal.

For example, in some embodiments a user may scan an area of interest at any desired rate and may thus determine the outline of an object with great accuracy, for example allowing the exact localization of reflecting objects and allowing the user to make an accurate mental image of reflecting objects in an area of interest.

For example, in some embodiments there is no problem in handling "lost light" events. In some instances light projected by the light-source enters a gap next to or in a first object or passes behind a first object, reflects from a reflecting object, and is then blocked from reaching the light-detector, for example, by the back side of the first object. In some embodiments, such "lost light" events do not lead to confusion or inaccuracies and the area of "lost light" is modulated as an area at infinite distance between two "normal" reflecting objects.

As noted above, in some embodiments a device as described herein comprises a hand-holdable housing having a front end and an axis, configured so when the housing is held in a human hand with the front end forwards, the axis points straight ahead. A housing of any suitable shape and size may be used in implementing a device as described herein. In some embodiments, a small inter-aperture separation allows the housing and the device as a whole to be more portable, ergonomic and convenient, increasing the utility of the device by making it easier for a user to carry and use the device. In some embodiments, a housing is elongated (e.g., similar to a television remote control, cellular telephone or the like) as such a shape is generally convenient to hold, transport and manufacture.

As noted above, in some embodiments a device as described herein comprises a light-source configured for projecting a beam of light through a light-source aperture in a direction from the front end of the housing that is not more than 4° divergent from parallel to the axis of the housing. In some embodiments it is preferred that the light-source project a beam of light as close as possible to parallel to the axis so that a user knows that distance information is acquired substantially from where the device is pointed. Thus, in some embodiments a beam of light is projected at not more than about 3°, not more than about 2° and in some embodiments not more than about 1° from parallel to the device axis.

A light-source projecting a light beam having any suitable wavelength or combinations of wavelengths may be used in implementing a device as described herein. In some embodiments the light-source is configured to project a substantially monochromatic beam of light, allowing greater confidence that detected light is light projected by the light source and reflected from a reflecting object and, as discussed below, allowing a relative reduction of background noise.

A light-source projecting a light-beam including any suitable wavelength of light may be used in implementing a device as described herein. In some embodiments it is preferred that light projected by a light-source of a device be non-visible so as not to distract or otherwise interfere with people and animals when the device is in use, even when the light beam is relatively intense. In some such embodiments, the light source is configured to produce a light beam comprising infrared light (700 nm-1 mm), especially near-infrared light (700 nm-1400 nm), that is not ordinarily visible to humans, for example light comprising or consisting of light with a wavelength of 780 nm or 880 nm. That said, in some embodiments the light projected by a light-source of a device comprises visible wavelengths of light (390 nm-750 nm).

A light-source projecting a light-beam having any suitable cross-sectional shape may be used in implementing a device as described herein. In some embodiments, the light-source is a point light-source projecting a substantially concentrated (e.g., substantially circular) light-beam, what allows relatively easier detection. In some embodiments, the light-source is a line light-source, producing a "fan" of light having a line cross section, as discussed hereinbelow.

A light-source projecting a light-beam having any suitable divergence may be used in implementing a device as described herein. In some embodiments, a greater divergence leads to a reduced range as the intensity of reflections become too weak to be detection. In some embodiments, greater divergence leads to multiple reflections at farther distances, although this is generally not a significant problem due to the distance-dependent distance resolution arising from the small inter-aperture separation. In some embodiments, a light-source projecting a beam having a relatively low nominal divergence is used in implementing a device as described herein, assisting in ensuring that the beam of light is reflected from only one reflecting object at a time and that the intensity of reflected light is sufficient to be detected even at greater distances. Accordingly, in some embodiments the light-beam projected by the light-source has a nominal divergence of not more than about 4 mrad, not more than about 2 mrad, not more than about 1 mrad and even not more than about 0.5 mrad.

Any suitable light-source may be used in implementing a device as described herein. For various reasons including widespread commercial availability, low-cost, sufficient intensity and low inherent divergence, in some embodiments the light-source is a laser light-source.

In some embodiments, it is preferred that the light-source be eye-safe. In some embodiments, a light-source is a Class 1 laser, that is to say, eye safe under all conditions of normal use. In some embodiments, a light-source is a Class 1M laser that is safe for use except when the light is passed through magnifying optics. In some embodiments, a light-source is a Class 2 or Class 2M laser that is safe because the blink reflex will limit exposure to a time short enough to avoid eye damage.

As noted above, in some embodiments a device as described herein comprises a light-detector configured to detect light projected by the light-source, reflected from a reflecting object located at a distance between a minimum distance and a maximum distance from the front end of the housing and entering through a light-detector aperture, at a frame rate where a detection location of the light reflected from a reflecting object on an epipolar line of the light-detector is dependent on the distance to the reflecting object.

In some embodiments, a device is configured so that only a limited range of wavelengths are detected by a light-detector, in some such embodiments substantially only a single wavelength of light. In some embodiments, a device comprises a light filter physically associated with the housing so that light reaching the light-detector passes through the light filter. In some such embodiments, the light filter is a narrow-pass light filter allows passage of as narrow a range of wavelengths as possible without excessive attenuation in order to reduce the chance of overexposure of the light-detector and/or to reduce the intensity of the detected background and/or to reduce the chance of detection of spurious signals.

In some embodiments, a device is configured so that substantially only the wavelength of light projected by the corresponding light-source (especially when the light-source is monochromatic) can be detected by the light-detector, for example, the device comprises a light filter allowing passage of light projected by the light-source.

In some such embodiments, a factor in selecting the light-source is the availability of suitable narrow pass light filters, for example from Optics Balzers AG (Balzers, Liechtenstein). For example, narrow pass filters for light of 780 nm or 880 nm are readily commercially available.

A light-detector having any suitable angle of view may be used in implementing a device as described herein. Generally, the angle of view is sufficiently large to allow acquisition of light reflected from reflecting objects both at the minimum distance and at the maximum distance. As is clear to one skilled in the art and as is seen by comparing FIGS. 2A and 2B, the smaller the inter-aperture separation, the smaller the required angle of view to acquire light reflected from reflecting objects at both the minimum distance and the maximum distance. A smaller angle of view has a number of advantages including reducing noise, reducing the detection of spurious signals (e.g., from a similar device or other type of device being used in the same area), and reducing the chance of the light-detector being over exposed. Thus, in some embodiments, the small inter-aperture separation allows the light-detector to have a small angle of view.

In some embodiments, the angle of view of the light-detector is not more than ten times, not more than eight times, not more than four times, not more than twice and even not more than 1.5 times the minimal angle of view required to acquire light reflected from a reflecting object at the minimum distance and from a reflecting object at the maximum distance.

In some embodiments, the angle of view of the light-detector is not more than about 10°, not more than about 8°, not more than about 5° and even not more than about 4°.

In some embodiments, an advantage of a small inter-aperture separation is (as seen from FIGS. 1A and 1B) that the angle at which light reflected from reflecting objects impinges changes significantly less as a function of the distance to a reflecting object. For example, it can be shown that in a device having an inter-aperture separation of 3 cm, light reflected from a far object at 500 cm impinges at 89.66° and light reflected from a near object at 50 cm, impinges at 86.57°, a difference of only 3.09°. Consequently, a light-detector vergence angle can be selected so that light reflected from all objects between the minimum and maximum distance impinges on a light-detector relatively close to perpendicular, increasing detection efficiency and reducing instances of "glancing" light where reflected light is detected at a plurality of detection locations. Thus, in some embodiments, the vergence angle of the light-detector is not more than 10°, not more than 7°, not more than 5° and even not more than 3° from parallel to the direction at which the light beam is projected.

In some embodiments, the light-detector vergence angle is selected so that light reflected by an object somewhere between the minimum and maximum distance, is perpendicular to the light-detector.

In some embodiments, the light-detector vergence angle is selected so that light reflected by an object at the minimum distance and by an object at the maximum distance impinge the light-detector at the same angle (with opposite signs). For example, in an embodiment of an inter-aperture separation of 3 cm, the vergence angle is 88.11° so that light reflected from an object 500 cm distant and from an object 50 cm distant both impinge on the light-detector at about 1.55°.

In some embodiments, the light-detector vergence angle is substantially 0°, that is to say, the light-detector is directed substantially in parallel to the direction of the light beam (and the light-detector aperture and the light-source aperture face the same direction). Such embodiments have the advantage of relatively simple construction as their is no need to carefully place the light-detector at a desired vergence angle. Although not ideal, as a result of a small inter-aperture separation the lack of ideality has little practical significance. For example, in the case of an inter-aperture separation of 3 cm, light reflected from an object at 50 cm impinges on the light-detector at about 3.43°.

An additional advantage of a small inter-aperture separation and small vergence angle is that there is no need for an artificial upper limit for the maximum distance, e.g, due to a limited angle of view. Although a device is generally designed to have a given maximum distance, with a small inter-aperture separation and small vergence angle, a device can effectively provide distance information about very far distances (e.g., 10 meters, 20 meters) that are not at an infinite distance, albeit with very poor distance resolution. Such a feature can be useful, for example, for a user to determine whether they are located in the open or in a large chamber. In such embodiments, the maximum distance is generally dependent on the sensitivity of the light-detector and the divergence of the projected light beam.

As noted above, the modulation of the perceptible signal is a function of the detection location of reflected light on the epipolar line of the light-detector, where the detection location is dependent on the distance to the reflecting object. A light-detector having any suitable resolution along the epipolar line between the detection location of light reflected from the minimum distance and the detection location of light reflected from the maximum distance may be used. In some embodiments, along the epipolar line between the detection location of light reflected from a reflecting object at the minimum distance and the detection location of light reflected from a reflecting object at the maximum distance there are at least about 20 distinct detection locations, at least about 100, at least about 200, at least about 300, at least about 400 and even at least about 600 distinct detection locations.

Generally, all things being equal, the greater the resolution of the light-detector along the epipolar line (that is to say, the greater the number of distinct detection locations) the better, as increasingly subtle changes in modulation will either be indiscernible to a user or be useful to a user who can discern the subtle differences. That said, a very high resolution may have a negative influence in terms of higher price, lower frame rate and reduced light sensitivity at each detection location. That said and as discussed below, these factors are generally insignificant in practical terms.

Any type of light-detector may be used in implementing a device as described herein In some embodiments, a light-detector is a pixelated light-detector comprising a plurality of individual light-detecting elements, e.g., a CMOS or CCD light-detector. In some embodiments, a CMOS light-detector is preferred as some embodiments of such detectors have a lower power usage and/or have a higher frame rate and/or have an output that is more readily useable without further processing. In some embodiments, a CCD light-detector is preferred as some embodiments of such detectors have a lower noise and/or a greater dynamic range.

In some embodiments, the light-detector comprises a two-dimensional array of individual light-detecting elements. As discussed in Yuan and Manduci, when a light-detector is a two-dimensional array of individual light detecting elements, most of the light-detecting elements are not used. Rather, after assembly and periodically, the device is optionally calibrated by determining which light-detecting elements are located along the epipolar line of the light-detector (generally a line of single light-detecting elements, or a band a few light-detecting elements broad) and only these light detecting elements need to be interrogated when determining a detection location.

In some embodiments, a group of individual light-detecting elements of a light-detector array define a single detection location. In some embodiments, a single light-detecting element of a light-detector array defines a single detection location. In some embodiments, a detection location is smaller than a single light-detecting element, for example by implementing a super resolution algorithm.

As is known to a person having ordinary skill in the art, 3.1 megapixel CMOS and CCD light-detectors having a two-dimensional array of 2048×1536 light-detecting elements are readily available at low prices, have high-speed and a good sensitivity. It is thus clear that a desired light-detector resolution is practically implementable with little effort.

In some embodiments, a device further comprises a lens to direct the reflected light to the light-detector. In some embodiments, the lens is a telephoto lens and even a super telephoto lens, assisting in implementing a small angle of view allowed by the small inter-aperture separation.

Seemingly, the use of a telephoto lens or a super telephoto lens is undesirable as such lenses have a very shallow depth of field, especially at distances between the typical minimum and maximum distance of a device as described herein. A very shallow depth of field means that except for light coming from objects at a narrow range of "in-focus" distances, most light entering the lens is not focused onto the light detector but is distributed over a relatively large area of the light detector. Implementing a focusing functionality to such a lens so that reflected light is focused onto the light detector adds complexity, expense and significantly reduces the frame rate of the device. That said, it has been found that in some embodiments the shallow depth of field of such lenses is advantageous: in some embodiments interference by background light is reduced by distributing the background over a large number of light-detecting elements and detection locations.

In some embodiments, reflected light is not located at a clearly-defined detection location. For example, due to the divergence of the light beam, in some embodiments the reflected light is detected on a relatively large area of the light detector by a plurality of (adjacent) individual light-detecting elements that correspond to two or more distinct detection locations. Such a problem is aggravated in embodiments when the device is devoid of a focusing capability, especially a device having a shallow depth of field such as with a telephoto or super telephoto lens.

Thus, in some embodiments, a device further comprises: a processor functionally associated with the light-detector, configured to identify a detection location, for example, from a plurality of light-detecting elements of the light detector on which reflected light has been detected. In some embodiments, the processor is configured to identify a detection location from a plurality of locations of the light-detector on which the reflected light has been detected. A person having ordinary skill in the art is able of implementing a simple center-finding algorithm that identifies a detection location as the center of a group of locations (e.g., separate light-detecting elements or distinct detection locations) of the light-detector on which the reflected light has been detected that is independent of the size of the group (due to lack of focus or light-beam divergence) and the shape of the group (e.g., resulting from reflection from an angled reflecting object). Importantly, in some embodiments, even if in some instances the processor incorrectly determines the center of a group of locations as a detection location, the high frame rate of a light-detector means that preceding and succeeding correct determinations render the incorrect determination of the detection location insignificant.

In some embodiments discussed above, the light-source is a point light-source and the light-detector is a two-dimensional array of light-detecting elements. As is clear to one skilled in the art, the teachings herein can be implemented using a line light-source and a light-detector that is a linear array of light-detecting elements, analogous to the discussed in Yuan and Manduci. In some embodiments, linear arrays of light-detecting elements allow a higher frame rate and higher sensitivity than two-dimensional arrays. That said, such embodiments may be less preferred as each point along the line of light projected of the line light-source has a low intensity compared to a point light-source.

As noted above, in some embodiments a device as described herein comprises a distance reporter functionally associated with the light-detector, configured to produce a signal perceptible to a human subject, the perceptible signal modulated as a function of the detection location at a reporting rate, where the perceptible signal is modulated differently for each of at least about 20 distinct detection locations. In some embodiments, a distance reporter comprises a processor such as a digital processor.

In some embodiments, the distance reporter is configured to modulate the perceptible signal at a reporting rate faster than half the frame rate, that is to say, the modulation of the perceptible signal is potentially changed as a result of reflected light being detected at a different detection location of the light detector, at a reporting rate faster than half the frame rate. For example, if the frame rate is 30 fps, the reporting rate is 16 Hz, or if the frame rate is 100 fps, the reporting rate is 51 fps. In some embodiments, the distance reporter is configured to modulate that perceptible signal at a reporting rate equal to the frame rate, for example, if the frame rate is 30 fps, the reporting rate is 30 Hz, and if the frame rate is 40 fps, the reporting rate is 40 Hz.

In some embodiments, modulation comprises modulating a frequency of the perceptible signal as a function of the detection location.

In some embodiments, for each distinct detection location there is a corresponding specific modulation of the perceptible signal, that is to say, there is a substantially one to one correspondence of a detection location to a specific modulation.

For example, in some embodiments including 200 distinct detection locations, the distance reporter is configured to produce a perceptible signal having one of 200 distinct modulations.

For example, in some embodiments where modulation comprises modulating a frequency of the perceptible signal as a function of the detection location, each detection location corresponds to a specific frequency of the perceptible signal. e.g., in some embodiments including 200 distinct detection locations, the distance reporter is configured to produce a perceptible signal having one of 200 distinct modulations.

In some embodiments, modulation of the perceptible signal comprises modulation of the signal (e.g., the frequency of the signal) as a function of a difference between an expected detection location and the actual detection location. In some such embodiments, the device further comprises a processor (e.g., a standard digital processor) storing a height of holding (e.g., as a user-inputable variable) and a pitch angle detector (such as an accelerometer known in the art of gaming-interfaces and portable telephony, in some embodiments physically associated with the housing), where the processor is configured to calculate the expected detection location from the height of holding and the determined pitch angle; and the processor configured to determine the difference between the calculated expected detection location and an actual detection location.

For example, in some such embodiments a device is configured to allow a user to input the typical height at which the device is held for use as "height of holding" and to store the typical height in a processor. During use, the pitch angle detector reports the pitch angle at which the device is held. Using simple geometry, the processor calculates what is the expected detection location if the light produced by the light-source was reflected from level ground assuming the device was held at "height of holding" above the ground at an angle reported by the pitch angle detector. The processor then calculates the difference between the expected detection location and the actual detection location on the light-detector by simple subtraction. In some embodiments, the perceptible signal is modulated as a function of the magnitude of the difference. In some such embodiments, a device is configured to provide a perceptible signal modulated as a function of the magnitude of the difference in addition to modulation where a distinct detection location corresponds to a specific modulation of the perceptible signal.

Any suitable distance reporter producing any suitable perceptible signal may be used in implementing a device as described herein.

In some embodiments, the distance reporter comprises a signal generator to generate the perceptible signal. In some embodiments, the signal generator is physically associated with the housing. In some embodiments, the signal generator is part of an assembly physically separate from the housing.

In some embodiments, the perceptible signal is an aural signal, perceptible to human hearing. In some such embodiments, the signal generator is part of an ear piece physically separate from the housing and is configured to be worn in proximity of an ear of a user. In some such embodiments, the signal generator is in wireless communication (e.g., Bluetooth®) with the light-detector.

In some such embodiments, the aural signal has a frequency between about 20 to 20000 Hz. That said, in some embodiments, it is preferred that the aural signal has a frequency between about 200 Hz and about 800 Hz. In some such embodiments, for each distinct detection location there is a corresponding specific frequency of the aural signal, so that a specific frequency substantially represents a distance to a reflecting object between the minimum and maximum distance. It has been found, that the human ear is sufficiently sensitive to hear subtle differences in frequency and also to hear the "frequency jump" when a discontinuity is detected. In some such embodiments, detection locations corresponding to reflections from closer objects correspond to aural signals having a higher frequency than detection locations corresponding to reflections from farther objects. In some embodiments, the distinct detection locations between the detection location of light reflected from a reflecting object at the minimum distance and the detection location of light reflected from a reflecting object at the maximum distance are mapped onto a 600 Hz frequency range, e.g, between 200 Hz and 800 Hz. In some embodiments, the distinct detection locations are mapped onto a smaller frequency range, e.g., a range of at least 500 Hz, at least 400 Hz, at least 300 Hz, at least 200 Hz and even onto a frequency range of at least 100 Hz.

For example, in some such embodiments, 200 distinct detection locations are mapped onto a 100 Hz range of frequencies, for example between 300 Hz and 400 Hz, that is to say the distance reporter is configured to produce 200 distinct frequencies between 300 Hz and 400 Hz, corresponding to the 200 distinct detection locations. e.g., 200 frequencies separated by about 0.5 Hz.

For example, in some such embodiments, 400 distinct detection locations are mapped onto a 300 Hz range of frequencies, for example between 200 Hz and 500 Hz, that is to say the distance reporter is configured to produce 400 distinct frequencies between 200 Hz and 500 Hz, corresponding to the 400 distinct detection locations. e.g., 400 frequencies separated by about 0.67 Hz.

For example, in some such embodiments, 800 distinct detection locations are mapped onto a 400 Hz range of frequencies, for example between 200 Hz and 600 Hz, that is to say the distance reporter is configured to produce 800 distinct frequencies between 200 Hz and 600 Hz, corresponding to the 800 distinct detection locations. e.g., 800 frequencies separated by about 0.50 Hz.

In some embodiments, a device comprises an operator-interface allowing a person such as a user or health professional to adjust the portion of the aural frequency range onto which the detection locations are mapped, for example in accordance with personal preference and hearing ability.

In some embodiments, the perceptible signal is a tactile signal. In some embodiments, the tactile signal comprises vibration, in some embodiments, non-audible vibration.

In some embodiments, the signal generator is configured to cause vibration of at least a portion of the housing, that is perceptible to at least a portion of the hand of a user.

In some embodiments, the signal generator is part of an assembly physically separate from the housing, in some embodiments in wireless (e.g., Bluetooth®) communication with the light-detector. In some embodiments, the signal generator is configured to cause vibration of a component physically separate from the housing.

In some such embodiments, the signal generator is part of an earpiece to be worn in proximity of the ear of a user and vibrations are felt, for example, behind the ear. In some such embodiments the signal generator is in wireless communication with the light-detector.

In some embodiments, the signal generator is a bracelet to be worn about the wrist of a user and vibrations are felt at the wrist of a user. In some such embodiments, the signal generator is in wired and in some embodiments in wireless communication with the light-detector.

In some embodiments, the signal generator is part of an assembly, e.g., a patch, configured to be placed in proximity of some sensitive portion of the body, e.g., the nape of the neck or the base of the jaw. In some such embodiments the signal generator is in wireless communication with the light-detector.

In some embodiments, a vibrating tactile signal has a frequency between about 1 Hz and about 300 Hz. That said, in some embodiments, it is preferred that the tactile signal has a frequency between about 50 Hz and about 300 Hz. In some such embodiments, for each distinct detection location there is a corresponding to a specific frequency of the tactile signal, so that the specific frequency substantially represents a distance to a reflecting object between the minimum and maximum distance. It has been found, that parts of the human body are sufficiently sensitive to feel subtle differences in a tactile frequency and also to feel the "frequency jump" when a discontinuity is detected. In some such embodiments, detection locations corresponding to reflections from closer objects correspond to tactile signals having a higher frequency than detection locations corresponding to reflections from farther objects. In some embodiments, the distinct detection locations between the detection location of light reflected from a reflecting object at the minimum distance and the detection location of light reflected from a reflecting object at the maximum distance are mapped onto a 250 Hz frequency range, e.g, between 50 Hz and 300 Hz. In some embodiments, the distinct detection locations are mapped onto a smaller frequency range, e.g., a range of at least 200 Hz, at least 150 Hz and even onto a frequency range of at least 100 Hz.

For example, in some such embodiments 200 distinct detection locations are mapped onto a 100 Hz range of frequencies, for example between 100 Hz and 200 Hz, that is to say the distance reporter is configured to produce 200 distinct frequencies between 100 Hz and 200 Hz, corresponding to the 200 distinct detection locations. e.g., 200 frequencies separated by about 0.5 Hz.

For example, in some such embodiments 400 distinct detection locations are mapped onto a 200 Hz range of frequencies, for example between 50 Hz and 250 Hz, that is to say the distance reporter is configured to produce 400 distinct frequencies between 50 Hz and 250 Hz, corresponding to the 400 distinct detection locations. e.g., 400 frequencies separated by about 0.25 Hz.

For example, in some such embodiments, 800 distinct detection locations are mapped onto a 250 Hz range of frequencies, for example between 50 Hz and 300 Hz, that is to say the distance reporter is configured to produce 800 distinct frequencies between 50 Hz and 300 Hz, corresponding to the 800 distinct detection locations. e.g., 800 frequencies separated by about 0.3 Hz.

In some embodiments, a device comprises an operator-interface allowing a person such as a user or health professional to adjust the portion of the tactile frequency range onto which the detection locations are mapped, for example in accordance with personal preference.

In some embodiments, a device comprises only one of an aural signal generator or a tactile signal generator, substantially as described above.

In some embodiments, a device comprises both an aural signal generator and a tactile signal generator substantially as described above. In some embodiments, the device comprises a switch allowing a user to select which signal generator produces a perceptible signal. In some embodiments, the device comprises a switch allowing a user to activate both signal generators to produce a perceptible signal.

In some embodiments, a light-source of a device as described herein is configured to project a continuous beam of light.

In some embodiments, a light-source of a device as described herein is configured to produce a flashing beam of light having a time-varying intensity synchronized with the light-detector frame rate. Such flashing increases the complexity of the device, but also reduces the chance that light from a different such device will be mistakenly identified as a reflection from a reflecting object. In some embodiments, such flashing allows the intensity of the beam to be increased without compromising safety.

In some embodiments, a device as described herein comprises a portable power source physically associated with the housing for supplying power required for operation of other device components such as the light-source and the light-detector. Typical power sources include batteries, especially rechargeable batteries (e.g., Li-Ion or Li—Ni rechargeable batteries), and fuel cells.

Figure 2:
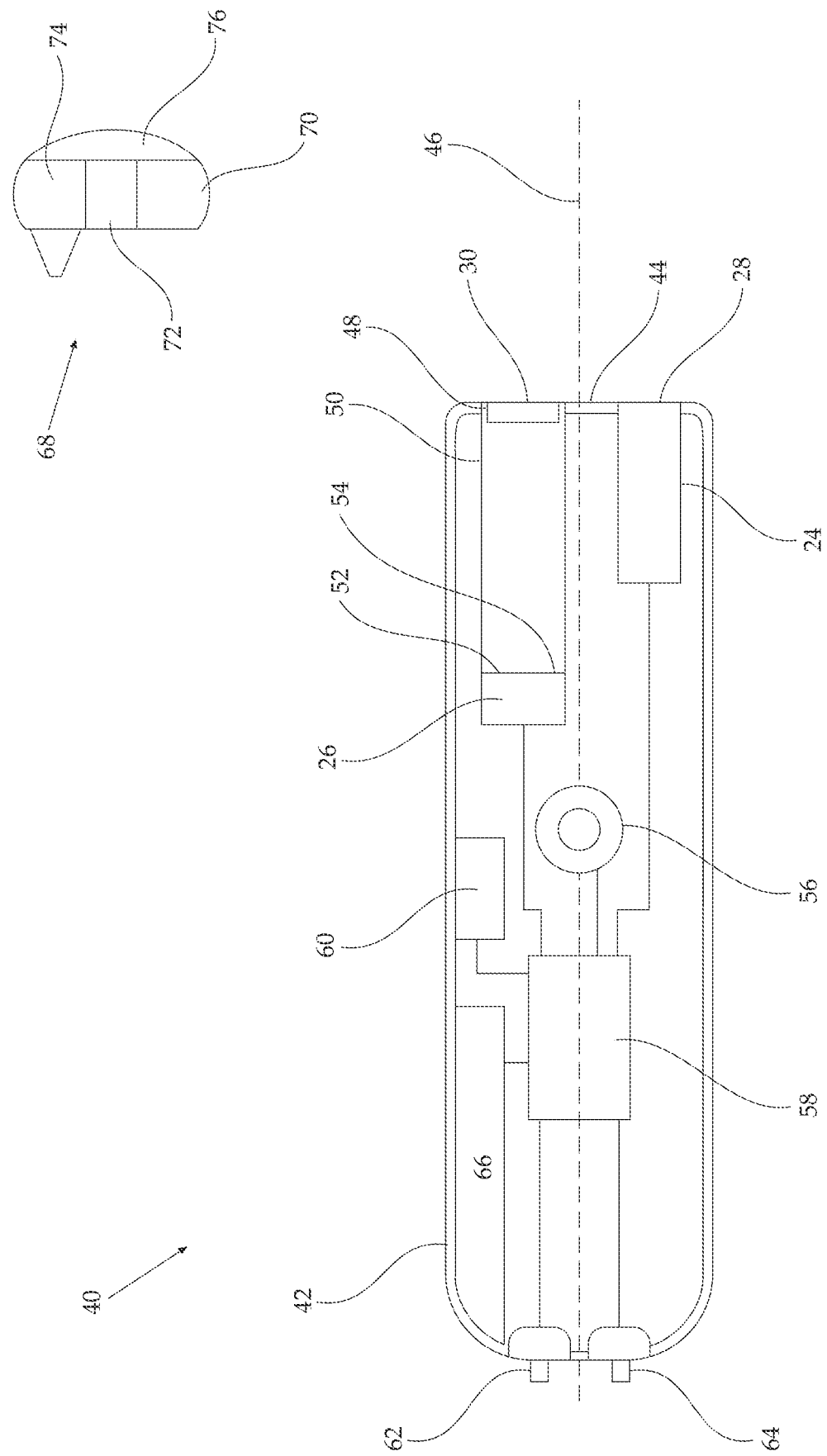
FIG. 2 is a schematic depiction, in cross-section, of an embodiment of a device as described herein.

In FIG. 2, an embodiment of a device for imparting distance information to a human subject, device 40 is schematically depicted.

Device 40 comprises an elongated hand-holdable housing 42 having a front end 44 and an axis 46.

Contained inside housing 42 and thus physically associated therewith is a light-source 24 with a light-source aperture 28. Light source 24 is a class I near-infrared laser configured for projecting a continuous beam of substantially monochromatic light with a wavelength of 780 nm and a beam divergence of 1 mrad. Light source 24 is secured so that the projected beam of light is projected substantially in parallel to axis 46.

Also contained inside housing 42 and thus physically associated therewith is a light detector 26, a 2048×1536 (3.1 megapixel) two-dimensional CCD array having a 60 fps frame rate known in the art of digital photography able to detect, inter alia, light having a wavelength of 780 nm, available, for example from Vision Research Inc. (Wayne, N.J., USA). Light-detector 26 is mounted perpendicularly to axis 46 and therefore has a vergence angle of 0°. Light-detector aperture 30 is separated by 3 cm from light-source aperture 28 and is functionally associated with a narrow pass light filter 48 configured to pass only light having a wavelength of about 780 nm. Light-detector 26 is functionally associated with a telephoto lens 50 having an angle of view of 6°. Telephoto lens 50 and light-detector 26 are mounted so that light projected by light source 24 and reflected from an object at a minimum distance of 50 cm is detected at a first detection location 52 (entering light-detector aperture 30 at an angle of 86.57°) and light reflected from an object at a maximum distance of 500 cm is detected at a second detection location 54 (entering light detection aperture at an angle of 89.66°). In this context, it is important to note that the angles and marking of detection locations 52 and 54 in FIG. 2 are distorted for clarity. The epipolar line between first detection location 52 and second detection location 54 includes 1000 pixels, each constituting a distinct detection location.

Contained inside housing 42 and therefore physically associated therewith is a tactile distance reporter, comprising a tactile signal generator 56, substantially a small piezoelectric speaker as known in the art of cellular telephony to which is secured a small silicone knob (0.5 cm$^2$).

Also contained inside housing 42 is a processor 58 (a general purposed integrated circuit) functionally associated with light source 24, light detector 26, tactile signal generator 56 and a wireless transceiver 60 (e.g., a Bluetooth® transmitter such as Avantalk BTDG-20 by Avantalk Ltd., Shenzen, China). Processor 58 is functionally associated with two switches: a two state on/off switch 62 and a three-state reporting mode switch 64 (tactile only/aural only/both). Processor 58 draws power from a power source 66 (a rechargeable battery) and distributes power as needed to the other components.

Device 40 further comprises earpiece 68, physically separate from housing 42. In device 40, earpiece 68 is a standard Bluetooth® enabled ear-piece known in the field of cellular telephones (e.g., Nokia Bluetooth Headset BH-209 from Nokia, Espoo, Finland) configured to be worn in proximity of the ear of a user. Earpiece 68 comprises a wireless (Bluetooth®) transceiver 70, a processor 72 (a general purpose integrated circuit) with an on/off switch (not depicted), an aural signal generator 74 (speaker) and an earpiece power source 76 (rechargeable battery).

Processor 58 is configured for controlling operation of light-source 24 and light-detector 26, including calculating a detection location along the epipolar line of light detector 26 as the center of a group of pixels that detect light projected from light source 24, being reflected from a reflecting object, and entering light-detector aperture 30.

Processor 58 is also configured to send an electronic signal to tactile signal generator 56 at a reporting rate of 60 Hz that is equal to the 60 fps frame rate to produce a vibrating tactile signal having a frequency of between 50 Hz and 200 Hz as a function of a detection location: a 200 Hz signal corresponding to first detection location 52 (minimum distance), a 50 Hz signal corresponding to second detection location 54 (maximum distance) with intermediate frequencies corresponding to intermediate detection locations. Specifically, processor 58 is configured so that each of the 1000 distinct detection locations are mapped onto the 150 Hz range of frequencies between 50 Hz and 200 Hz, so that the signal generator produces 1000 distinct frequencies separated by about 0.15 Hz between 50 Hz and 200 Hz, corresponding to the 1000 distinct detection locations.

Processor 58 is also configured to transmit an electronic signal using wireless transceiver 60 to aural signal generator 74 in earpiece 68 at a reporting rate of 60 Hz that is equal to the 60 fps frame rate, to produce an aural signal having a frequency of between 300 Hz and 600 Hz as a function of a detection location: a 300 Hz signal corresponding to first detection location 52 (minimum distance), a 600 Hz signal corresponding to second detection location 54 (maximum distance) with intermediate frequencies corresponding to intermediate detection locations. Specifically, processor 58 is configured so that each of the 1000 distinct detection locations are mapped onto the 300 Hz range of frequencies between 300 Hz and 600 Hz, so that the signal generator produces 1000 distinct frequencies separated by about 0.33 Hz between 300 Hz and 600 Hz, corresponding to the 1000 distinct detection locations.

For use, housing 42 of device 40 is held in a hand of a user and earpiece 68 of device 40 is placed behind the ear of a user. Earpiece 68 is turned on and processor 58 is turned on using on/off switch 62. The user uses reporting mode switch 64 to select one of the three possible reporting modes.

Processor 58 provides power to light-source 24 to produce a beam of light exiting from light-source aperture 28 in parallel to axis 46. When the beam of light is reflected by a reflecting object between the minimum distance and the maximum distance, the reflected light enters through light-detector aperture, passes through light filter 48 and is directed by telephoto lens to a location on light-detector 26 to illuminate an area on and around the epipolar line of light-detector 26 consisting of one or more individual light-detecting elements (pixels).

At the frame rate, processor 58 calculates which pixel on the epipolar line corresponds to the center of the illuminated area and designates that pixel as the current detection location. If the user chose to receive a tactile signal, processor 58 sends an electronic signal at the reporting rate that causes tactile signal generator 56 to vibrate at the frequency that corresponds to the current detection location. If the user chose to receive an aural signal, processor 58 sends an appropriate command through wireless transceiver 60 at the reporting rate. The command is received by wireless transceiver of 70 of earpiece 68, that is translated by earpiece processor 72 to cause aural signal generator 74 to vibrate at the audible frequency that corresponds to the current detection location.

The user hears the audible signal from aural signal generator 74 and can optionally place a finger or thumb on the knob of tactile signal generator 56 to feel the vibrations of the tactile signal.

As the user scans an area of interest by moving housing 42 so that axis 46 points at different reflecting objects, the frequency of the aural signal and the tactile signal change at the reporting rate, indicating the changing distances to reflecting objects.

It is appreciated that certain features of the invention, which are, for clarity, described in the context of separate embodiments, may also be provided in combination in a single embodiment. Conversely, various feature is of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

The invention claimed is:

1. A device for imparting distance information to a human subject, comprising:
   a) a hand-holdable housing having a front end and an axis, configured so when said housing is held in a human hand with said front end forwards, said axis points straight ahead;
   b) physically associated with said housing, a light-source configured for projecting a beam of light through a light-source aperture in a direction not more than 4° divergent from parallel to said axis;
   c) physically associated with said housing, a light-detector configured to detect light projected by said light-source, reflected from a reflecting object located at a distance from said front end between a minimum distance and a maximum distance and entering through a light-detector aperture, at a frame rate where a detection location of said light reflected from a reflecting object on an epipolar line of said light-detector is dependent on said distance to the reflecting object; and
   d) functionally associated with said light-detector, a distance reporter configured to produce a signal perceptible to a human subject, said perceptible signal modulated as a function of said detection location at a reporting rate;
   wherein said light-source aperture and said light-detector aperture are separated by an inter-aperture separation of not more than about 5 cm,
   wherein along said epipolar line between said detection location of light reflected from a reflecting object at said minimum distance and said detection location of light reflected from a reflecting object at said maximum distance there are at least about 20 distinct detection locations, and
   wherein said perceptible signal is modulated differently for each of said at least about 20 distinct detection locations.

2. The device of claim 1, wherein said minimum distance is not more than about 120 cm.

3. The device of claim 1, wherein said maximum distance is at least about 200 cm.

4. The device of claim 1, wherein a vergence angle of said light-detector is not more than about 10° from parallel to said direction.

5. The device of claim 1, wherein an angle of view of said light-detector is not more than about ten times the minimal angle of view required to acquire light reflected from a reflecting object at said minimum distance and from a reflecting object at said maximum distance onto said light-detector.

6. The device of claim 1, wherein an angle of view of said light-detector is not more than about 10°.

7. The device of claim 1, wherein said frame rate is at least about 15 fps.

8. The device of claim 1, wherein said distance reporter is configured to modulate said perceptible signal at a reporting rate faster than half said frame rate.

9. The device of claim 1, wherein said distance reporter is configured to modulate said perceptible signal at a reporting rate equal to said frame rate.

10. The device of claim 1, wherein along said epipolar line between said detection location of light reflected from a reflecting object at said minimum distance and said detection location of light reflected from a reflecting object at said maximum distance there are at least about 100 distinct detection locations, and wherein said perceptible signal is modulated differently for each of said at least about 100 distinct detection locations.

11. The device of claim 1, further comprising a lens to direct said reflected light to said light-detector.

12. The device of claim 11, wherein said lens is a telephoto lens.

13. The device of claim 1, wherein said modulation of said perceptible signal comprises modulating a frequency of said perceptible signal as a function of said detection location.

14. The device of claim 1, wherein for each said distinct detection location there is a corresponding specific modulation of said perceptible signal.

15. The device of claim 1, wherein said modulation of said perceptible signal comprises modulating a frequency of said perceptible signal as a function of a difference between an expected detection location and an actual detection location.

16. The device of claim 15, further comprising:
   a processor storing a height of holding; and
   a pitch angle detector to determine a pitch angle of said housing
   said processor configured to calculate said expected detection location from said height of holding and said determined pitch angle; and
   said processor configured to determine a difference between said expected detection location and an actual detection location.

17. The device of claim 1, wherein said perceptible signal is an aural signal.

18. The device of claim 17, further comprising a signal generator to generate said aural signal, wherein said signal generator comprises an assembly separate from said housing.

19. The device of claim 1, wherein said perceptible signal is a tactile signal.

20. The device of claim 19, wherein said tactile signal has a frequency between about 50 and about 300 Hz.

\* \* \* \* \*